United States Patent [19]

Inoue et al.

[11] Patent Number: 5,939,184
[45] Date of Patent: Aug. 17, 1999

[54] POLYOLEFIN-BASED COMPOSITE MATERIAL CONTAINING A STRATIFORM SILICATE AND PRODUCTION PROCESS THEREFOR

[75] Inventors: Hirofumi Inoue; Teruo Hosokawa, both of Kawasaki, Japan

[73] Assignee: Showa Denko K.K., Tokyo, Japan

[21] Appl. No.: 08/855,610

[22] Filed: May 13, 1997

[30] Foreign Application Priority Data

May 14, 1996 [JP] Japan ................................. 8-119389

[51] Int. Cl.⁶ ................................. B32B 5/16; C08K 3/34
[52] U.S. Cl. ..................... 428/331; 428/522; 428/523; 524/442; 524/504
[58] Field of Search ..................... 428/331, 522, 428/523; 524/504, 442; 525/63, 64, 65, 66, 69, 74, 75, 78, 80; 502/62, 77

[56] References Cited

U.S. PATENT DOCUMENTS

| | | | |
|---|---|---|---|
| 3,084,117 | 4/1963 | Nahin et al. | 204/158 |
| 3,941,871 | 3/1976 | Dwyer et al. | 423/326 |
| 4,417,019 | 11/1983 | Yamamoto et al. | 524/456 |
| 4,565,681 | 1/1986 | Kuhl | 423/328 |
| 4,585,639 | 4/1986 | Szostak | 423/328 |
| 4,592,902 | 6/1986 | Valyocsik | 423/328 |
| 5,244,970 | 9/1993 | Kobayashi et al. | 525/63 |
| 5,414,044 | 5/1995 | Moriya et al. | 525/74 |

FOREIGN PATENT DOCUMENTS

| | | |
|---|---|---|
| 0387903 | 9/1990 | European Pat. Off. . |
| 3810006 | 10/1988 | Germany . |
| 19500426 | 1/1995 | Germany . |
| 62-74957 | 4/1987 | Japan . |
| 63-215775 | 9/1988 | Japan . |
| 63-221168 | 9/1988 | Japan . |
| 649202 | 1/1989 | Japan . |
| 2305828 | 12/1990 | Japan . |
| 641346 | 2/1994 | Japan . |
| 770357 | 3/1995 | Japan . |
| 7157592 | 6/1995 | Japan . |
| 7331092 | 12/1995 | Japan . |
| 8302068 | 11/1996 | Japan . |

*Primary Examiner*—H. Thi Le
*Attorney, Agent, or Firm*—Sughrue, Mion, Zinn, Macpeak & Seas, PLLC

[57] ABSTRACT

A material which exhibits enhanced mechanical strength and heat resistance is provided, comprising: (a) 99.9 to 60% by weight of a modified polyolefin or a polyolefin containing such a modified polyolefin in an amount of at least 1% by weight, the modified polyolefin having a copolymer portion as a graft or a block in a polyolefin, the copolymer portion made of an unsaturated carboxylic acid or a derivative thereof and a monomer, which has a monomer reactivity ratio, the product of which, when multiplied by a monomer reactivity ratio of the unsaturated carboxylic acid or the derivative thereof, is 1 or less; and (b) 0.1 to 40% by weight of a lipophilic interstratified compound in which tetraalkylammonium cation is inserted in a swellable stratiform silicate; can be obtained simply by taking the steps of mixing and melt-kneading in the absence of a solvent, without swelling and cleaving a stratiform silicate compound using a swelling/dispersing medium or the like, such as an organic solvent.

10 Claims, No Drawings

POLYOLEFIN-BASED COMPOSITE MATERIAL CONTAINING A STRATIFORM SILICATE AND PRODUCTION PROCESS THEREFOR

BACKGROUND OF THE INVENTION

1. Field of the Invention

The present invention relates to a polyolefin-based composite material which is excellent in impact resistance and heat resistance, and which is applicable to automobile parts, household electrical product materials, aircraft parts, and construction materials. The present invention also relates to a process for producing such a polyolefin-based composite material in a very simple and economical manner in comparison with conventional processes.

2. Description of Related Art

In order to improve properties of polypropylene and other polyolefin resins, mechanical properties and heat resistance in particular, mixing and melt-kneading of a highly rigid inorganic filler has been hitherto considered. Since a polyolefin resin composition with an addition of an inorganic filler exhibits excellent rigidity and heat resistance, such a polyolefin resin composition has been widely employed as a molding material, particularly in the fields of automobile parts and household electrical products.

It has been known that performances of a composite material, such as rigidity, impact resistance, and heat resistance, can be enhanced by using a filler finely prepared to the submicron level, and controlling the dispersion of the filler (see Japanese Patent Application, First Publication (Kokai), No. Hei 7-157592).

According to this process, however, since repeated grinding steps and classification steps are required in order to obtain the extremely fine filler grains, the filler is expensive, and this process is thus not economical.

Another process has been known in which a filler is dispersed into a resin composition by introducing an amine into a compound having a stratified structure so as to widen gaps between strata, thereafter inserting a desirable monomer in the gaps, and polymerizing the monomer; the clay mineral having a stratified structure is thereby allowed to collapse by itself using the energy generated during the polymerization, and dispersing the clay mineral at the nanometer level (for example, Japanese Patent Application, First Publication (Kokai), No. Sho 62-74957; Japanese Patent Application, First Publication (Kokai), No. Sho 64-9202; etc.).

However, although this process permits uniform dispersing of filler with a great efficiency, the polymerization reaction is limited to radical polymerization or condensation polymerization. Furthermore, since the monomer introduced into the gaps between strata, which is an olefin monomer, such as ethylene, propylene, butene, and isoprene, is non-polar, the monomer must be liquefied, and the polymerization reaction must be conducted under high pressure or in a highly concentrated condition, so as to leave the monomer consistently in the gaps between strata. However, even in a homopolymerization or copolymerization system, it is difficult to use the above monomers in reality. Moreover, since a special polymerization facility is required for the polymerization of the monomer, the high fixed cost included in the product price makes this process uneconomical.

Furthermore, application of the above process to an anionic coordination polymerization system or radical polymerization system, which is taken for polyolefin, would be inappropriate, since active hydrogen in an amino acid or the like which exists in the gaps between the strata acts as a catalytic poison in the reaction atmosphere, making it difficult to increase the molecular weight and to control the tacticity with regard to the polymer yielded.

Yet another process has been known as a means for dispersing a filler into polyolefin, according to which a silicate compound in which an onium salt such as an ammonium salt is retained is employed (see Japanese Patent Application, First Publication (Kokai), No. Hei 6-41346, and Japanese Patent Application, First Publication (Kokai), No. Hei 7-70357).

According to such a process, a compound which is swelled and cleaved to form the stratal gaps of 5 nm or larger by means of a swelling/dispersing medium made of an organic solvent and the like should be used in order to finely and uniformly disperse the stratiform silicate which is made lipophilic by an onium salt. However, removal of the solvent would make this process impractical from an environmental perspective, and kneading in the presence of the solvent would degrade the productivity, and would make this process uneconomical. Furthermore, complete removal of the solvent or the like in the obtained composite material is difficult, and adversely affects the performances of the composition, such as heat resistance and rigidity. Therefore, it has been desired that filler be dispersed finely and uniformly into polyolefin without using a solvent.

That is to say, although it has been possible to finely and uniformly disperse a filler into polyamide, dispersion of such a filler in polyolefin has not hitherto be practical.

SUMMARY OF THE INVENTION

The present invention, which has been made in order to solve the above problems, has as an object thereof to provide a polyolefin-based composite material which exhibits enhanced mechanical strength and heat resistance, simply by taking the steps of mixing and melt-kneading in the absence of a solvent, without swelling and cleaving a stratiform silicate compound using a swelling/dispersing medium or the like, such as an organic solvent.

The present inventors have diligently conducted studies in order to solve the above problems in the conventional arts and have carried out various systematic experiments, which resulted in the present invention.

A polyolefin-based composite material according to the present invention is characterized by comprising:

(a) 99.9 to 60% by weight of a modified polyolefin or a polyolefin containing such a modified polyolefin in an amount of at least 1% by weight, the modified polyolefin having a copolymer portion as a graft or a block in a polyolefin, the copolymer portion made of an unsaturated carboxylic acid or a derivative thereof (hereinafter referred to as "$M_1$") and a monomer (hereinafter referred to as "$M_2$"), which has a monomer reactivity ratio, the product of which, when multiplied by a monomer reactivity ratio of $M_1$, is 1 or less; and (b) 0.1 to 40% by weight of a lipophilic interstratified compound in which tetraalkylammonium cation is inserted in a swellable stratiform silicate.

In the above condition, it is preferable that both monomer reactivity ratios of $M_1$ and $M_2$ be 1 or less.

In addition, the swellable stratiform silicate preferably has a charge density of 40 to 150 $Å^2$/charge, a basal plane distance d(001) of 7 to 15 Å, and a cation exchange capacity (hereinafter referred to as "CEC") of 25 to 200 milliequivalents/100 g.

Furthermore, the tetraalkylammonium cation preferably has at least one alkyl group having a carbon number length of the principal chain of 4 to 30, and in an amount of 0.3 to 5 equivalents with respect the CEC of the swellable stratiform silicate.

Moreover, in a polyolefin-based composite material according to the present invention, the swellable stratiform silicate is preferably uniformly dispersed as stratified bodies having a length of at least 300 Å and having up to 10 strata.

A process for producing a polyolefin-based composite material according to the present invention is characterized by comprising the step of melt-kneading in the absence of a solvent the above modified polyolefin, or the polyolefin containing such a modified polyolefin in an amount of at least 1% by weight, together with the above lipophilic interstratified compound in which tetraalkylammonium cation is inserted in a swellable stratiform silicate.

In particular, it is preferable that the lipophilic interstratified compound, in which tetraalkylammonium cation is inserted in a swellable stratiform silicate, be dispersed in the absence of a solvent into the modified polyolefin having a copolymer portion, which is made of $M_1$ and $M_2$, as a graft or a block in a polyolefin, and thereafter, melt-kneading be carried out together with a polyolefin.

A preferable modified polyolefin to be used in this production process may be obtained by irradiating a polyolefin with ionizing radiation, and thereafter bringing the polyolefin into contact with an unsaturated carboxylic acid or a derivative thereof, and with a monomer, which has a monomer reactivity ratio, the product of which, when multiplied by a monomer reactivity ratio of the unsaturated carboxylic acid or the derivative thereof, is 1 or less.

In addition, after the modified polyolefin (obtained by irradiating a polyolefin with ionizing radiation, and thereafter bringing the polyolefin into contact with an unsaturated carboxylic acid or a derivative thereof, and with a monomer, which has a monomer reactivity ratio, the product of which, when multiplied by a monomer reactivity ratio of the unsaturated carboxylic acid or the derivative thereof, is 1 or less) and the lipophilic interstratified compound (obtained by inserting tetraalkylammonium cation into a swellable stratiform silicate) are kneaded in contact in the absence of a solvent, it is also preferable that they should be brought into contact and mixed with a polyolefin in the presence of a coupling agent.

As explained above in detail, a polyolefin-based composite material according to the present invention has an enhanced heat resistance and rigidity in comparison with a polyolefin-based composite material obtained by a conventional technique, and the production process therefor according to the present invention is simpler than a conventional production process, and can utilize inexpensive (existing) production facilities; therefore, a polyolefin-based composite material and a production process therefor according to the present invention are useful for automobile parts, household electrical product materials, aircraft parts, and construction materials, and in the production thereof

DESCRIPTION OF THE PREFERRED EMBODIMENTS

The present invention will be explained further in detail hereinbelow.

Component (a) according to the present invention is a modified polyolefin, or a polyolefin containing such a modified polyolefin in an amount of at least 1% by weight, the modified polyolefin being a graft copolymer or block copolymer of an unsaturated carboxylic acid or a derivative thereof ($M_1$) and a monomer ($M_2$). In this situation, the product of the monomer reactivity ratio $r_1$ of the unsaturated carboxylic acid or the derivative thereof and the monomer reactivity ratio $r_2$, which is represented by $r_1 \cdot r_2$, is required to be 1 or less.

As is commonly known, the product of monomer reactivity ratios ($r_1 \cdot r_2$) employed in the present invention is taken as a measure of mutual copolymerizability in general, and is obtained from the following calculation formula (see "Polymer Handbook" SECOND EDITION, J. BRANDRUP and E. H. IMMERGUT, Editors with the collaboration of W. McDOWELL, A WILEY-INTERSCIENCE PUBLICATION; and "Kyojugo 1—Hanno Kaiseki—" (Copolymerization 1—Reaction Analysis—), published by Baifukan, Jun. 20, 1975)

$$r_1 \cdot r_2 = \exp[-(e_1 - e_2)^2]$$

In this formula, $e_1$ and $e_2$ are values related to reaction rate constants corresponding to the components $M_1$ and $M_2$, respectively, and are parameters expressing the degrees of polar effect.

In addition, it is preferable that both the monomer reactivity ratio $r_1$ of the unsaturated carboxylic acid or the derivative thereof $M_1$ and the monomer reactivity ratio $r_2$ of the monomer $M_2$ be 1 or less. However, even if the monomer reactivity ratio $r_1$ is 1 or greater, as long as the product of the monomer reactivity ratios is 1 or less, although the degree of copolymerization of the unsaturated carboxylic acid or the derivative thereof $M_1$ and the monomer $M_2$ decreases, the degree of polymerization of the unsaturated carboxylic acid or the derivative thereof in homopolymeric graft component can be increased due to the presence of the monomer $M_2$, and a great number of polar groups can be introduced in the principal chain of the polyolefin.

Examples of the unsaturated carboxylic acid or the derivative thereof ($M_1$) in component (a) according to the present invention are an unsaturated carboxylic acid derivative; an acid anhydride; a derivative containing epoxy group, amide group, onium group, hydroxyl group, or imide group; and a metal salt.

Examples of the unsaturated carboxylic acid are acrylic acid, methacrylic acid, maleic acid, fumaric acid, itaconic acid, citraconic acid, endo-bicyclo[2.2.1]-1,4,5,6,7,7-hexachloro-5-heptene-2,3-dicarboxylic acid, endo-bicyclo[2.2.1]-5-heptene-2,3-dicarboxylic acid, cis-4-cyclohexane-1,2-dicarboxylic acid, crotonic acid, isocrotonic acid, angelic acid, and sorbic acid.

Examples of the anhydride are maleic anhydride, itaconic anhydride, citraconic anhydride, endo-bicyclo[2.2.1]-1,4,5,6,7,7-hexachloro-5-heptene-2,3-dicarboxylic anhydride, endo-bicyclo[2.2.1]-5-heptene-2,3-dicarboxylic anhydride, and cis-4-cyclohexane-1,2-dicarboxylic anhydride.

Examples of the derivative containing epoxy group are glycidyl acrylate, glycidyl methacrylate, glycidyl ester of itaconic acid, monoglycidyl ester of butenetricarboxylic acid, diglycidyl ester of butenetricarboxylic acid, triglycidyl ester of butenetricarboxylic acid, allyl glycidyl ether, 2-methylallyl glycidyl ether, styrene p-glycidyl ether, 3,4-epoxybutene, 3,4-epoxy-3-methyl-1-butene, 3,4-epoxy-1-pentene, 3,4-epoxy-3-methyl-1-pentene, and vinylcyclohexane monoxide.

Examples of the derivative containing amide group are allylamine, aminoethyl methacrylate, aminopropyl methacrylate, dimethyaminoethyl methacrylate, acrylamide, methacrylamide, maleic acid monoamide, maleic acid diamide, maleic acid N-monoethylamide, maleic acid N,N-diethylamide, fumaric acid monoamide, and fumaric acid diamide.

Examples of the derivative containing onium group are ethyltrimethylammonium chloroacrylate, ethyltrimethylammonium chloromethacrylate, and 4-vinylpyridine hydrochloride.

Examples of the derivative containing hydroxyl group are 2-hydroxyethyl acrylate, 2-hydroxyethyl methacrylate, 3-hydroxypropyl acrylate, 3-hydroxypropyl methacrylate, 2,3,4,5-tetrahydroxypentyl acrylate, 2,3,4,5-tetrahydroxypentyl methacrylate, 3-hydroxy-1-propene, 4-hydroxy-1-butene, cis-4-hydroxy-2-butene, trans-4-hydroxy-2-butene, and 3-hydroxy-2-methyl-1-propene, Examples of the derivative containing imide group are maleimide, N-butylmaleimide, N-phenylmaleimide, and N-cyclohexylmaleimide.

Examples of the diene-based monomer are 1,3-butadiene, isoprene, and 2-ethyl-1,3-butadiene.

Examples of the nitrile-based monomer are acrylonitrile, methacrylonitrile, allyl cyanide, 2-butenenitrile, cis-pentenenitrile, and trans-pentenenitrile.

Table 1 shows examples of combinations of $M_1$ and $M_2$, the products of the monomer reactivity ratios thereof, i.e., $r_1 \cdot r_2$, are 1 or less (preferably, both monomer reactivity ratios of $M_1$ and $M_2$ are 1 or less); however, combinations of $M_1$ and $M_2$ to be used in the production of a graft polyolefin are not limited to those shown in Table 1, and any combination may be arbitrarily selected from the aforementioned monomers.

TABLE 1

| Example | $M_1$ | $e_1$ | $Q_1$ | $M_2$ | $e_2$ | $Q_2$ | $r_1$ | $r_2$ | $r_1 \cdot r_2$ |
|---|---|---|---|---|---|---|---|---|---|
| 1 | Maleic anhydride | 2.25 | 0.23 | Styrene | −0.80 | 1.00 | $2.4 \times 10^{-3}$ | 0.38 | $9.1 \times 10^{-5}$ |
| 2 | Maleic annydride | 2.25 | 0.23 | methylstyrene | −1.27 | 0.98 | $9.3 \times 10^{-4}$ | 0.0487 | $4.4 \times 10^{-6}$ |
| 3 | Maleic annydride | 2.25 | 0.23 | Methyl methacrylate | 0.40 | 0.74 | $4.83 \times 10$ | 6.74 | 0.032 |
| 4 | Glycidyl methacrylate | 0.57 | 1.03 | styrene | −0.80 | 1.00 | 0.47 | 0.324 | 0.153 |
| 5 | Glycidyl methacrylate | 0.57 | 1.03 | methylstyrene | −1.27 | 0.98 | $4.83 \times 10^{-}$ | 6.74 | 0.032 |
| 6 | Glycidyl methacrylate | 0.57 | 1.03 | 2-Vinylpyridine | −0.50 | 1.30 | 0.43 | 0.74 | 0.32 |
| 7 | Glycidyl methacrylate | 0.57 | 1.03 | Butyl methacrylat | 0.47 | 0.67 | 1.42 | 0.69 | 0.98 |
| 8 | Glycidyl methacrylate | 0.57 | 1.03 | Isoprene | −1.22 | 3.33 | 0.111 | 0.364 | 0.041 |
| 9 | Hydroxyethyl methacrylate | 0.20 | 0.80 | Styrene | −0.80 | 1.00 | 0.47 | 0.655 | 0.562 |
| 10 | Hydroxyethyl metnacrylate | 0.20 | 0.80 | α-methylstyrene | −1.27 | 0.98 | 0.608 | 0.189 | 0.114 |
| 11 | Glycidyl metnacrylate | 0.57 | 1.03 | Butyl vinyl ether | −1.20 | 0.087 | 4.31 | 0.010 | 0.043 |
| 12 | Glycidyl metnacrylate | 0.57 | 1.03 | Benzyl vinyl ethe | −0.41 | 0.046 | 12.7 | 0.030 | 0.38 |
| 13 | Glycidyl methacrylate | 0.57 | 1.03 | N-vinylpyrrolidon | −1.14 | 0.14 | 2.77 | 0.019 | 0.054 |

Examples of the metal salt are sodium acrylate, calcium acrylate, sodium methacrylate, and calcium methacrylate.

The monomer $M_2$ in the present invention is an unsaturated compound which has a monomer reactivity ratio, the product of which, when multiplied by a monomer reactivity ratio of $M_1$, represented by $r_1 \cdot r_2$, is 1 or less (preferably both $r_1$ and $r_2$ are 1 or less); examples of such a monomer $M_2$ are styrene-based monomer, vinylpyridine-based monomer, diene-based monomer, and nitrile-based monomer.

Examples of the styrene-based monomer are styrene, α-methylstyrene, o-methyl-α-methylstyrene, m-methyl-α-methylstyrene, p-methyl-α-methylstyrene, p-methoxy-α-methylstyrene, p-chloromethyl-α-methylstyrene, 2-chlorostyrene, p-chlorostyrene, 2,4-dichlorostyrene, p-methylstyrene, p-ethylstyrene, p-phenylstyrene, divinylbenzene, p-chloromethylstyrene, p-chlorobenzylstyrene, p-methoxystyrene, p-ethoxystyrene, p-phenoxystyrene, p-(chloromethoxy)styrene, and p-(chlorophenoxy)styrene.

Examples of the vinylpyridine-based monomer are 2-vinylpyridine, 4-vinylpyridine, 2-vinylpyridine N-oxide, 2-vinyl-5-methylpyridine, and 2-vinyl-5-ethylpyridine.

In Table 1:

$$r_1 \cdot r_2 = \exp[-(e_1 - e_2)^2]$$

$$r_1 = [Q_1/Q_2]\exp[-e_1(e_1 - e_2)]$$

$$r_2 = [Q_2/Q_1]\exp[-e_2(e_2 - e_1)]$$

The "Q" and "e" values are taken from J. BRANDRUP, et al., ed., "Polymer Handbook", Interscience.

Among the above combinations, a combination in which $M_1$ is glycidyl acrylate, maleic anhydride, or glycidyl methacrylate and $M_2$ is a styrene-based monomer is preferable, and the combination of glycidyl methacrylate and styrene is particularly preferable.

In the present invention, organic peroxide used in producing the modified polyolefin is not particularly limited and may be arbitrarily selected. A single organic peroxide may be employed, and two or more organic peroxides may also be employed in combination.

Examples of the organic peroxide are dialkyl peroxides such as di-t-butyl peroxide, t-dicumyl peroxide, and dicumyl peroxide; diacyl peroxides such as diacetyl peroxide and isobutyryl peroxide; peroxycarbonates such as di-i-propyl peroxycarbonate and di-2-ethylhexyl peroxycarbonate; peroxyesters such as t-butyl peroxypivalate and t-butyl peroxylaurate; ketone peroxides such as methyl ethyl ketone peroxide; peroxyketals such as 1,1-bis-t-butylperoxycyclohexane and 2,2-bis-t-butylperoxyoctane; hydroperoxides such as t-butyl hydroperoxide and cumene hydroperoxide, and azo compounds such as 2,2'-azobisisobutyronitrile and 2,2'-azobis(2,4,4-trimethylvaleronitrile).

Examples of the polyolefin of component (a) according to the present invention are homopolymers of a-olefin such as ethylene, propylene, 1-butene, 1-hexane, and 4-methyl-1-pentene, or random or block copolymers of two or more types of such α-olefins.

Examples of the polyolefin are polyethylene, polypropylene, poly(1-butene), poly(1-hexene), polyisobutene, poly(3-methyl-1-pentene), poly(4-methyl-1-pentene), copoly(ethylene/propylene), copoly(ethylene/1-butene), copoly(propylene/4-methyl-1-pentene), copoly (propylene/1-butene), copoly(ethylene/propylene/1-butene), and copoly(decene/1-methyl-1-pentene).

In carrying out the present invention, a graft copolymer of an unsaturated carboxylic acid or a derivative thereof $M_1$ and a monomer $M_2$, which has a monomer reactivity ratio, the product of which, when multiplied by a monomer reactivity ratio of $M_1$, represented by $r_1 \cdot r_2$, is 1 or less (preferably both $r_1$ and $r_2$ are 1 or less), may be produced by way of various methods such as suspension polymerization, emulsion polymerization, solution polymerization, and bulk polymerization (including a method using an extruder).

Examples of the production method are a method in which a modified polyolefin is obtained by thoroughly mixing a polyolefin and a graft monomer together with an organic peroxide using a tumbler, a Henschel mixer, a ribbon mixer, or the like, and thereafter carrying out melt-kneading in a melt-kneading device; a method in which a modified polyolefin is obtained by dissolving a polyolefin in an organic solvent such as xylene, thereafter adding thereto an organic peroxide under a nitrogen atmosphere, allowing the mixture to react while stirring, and after cooling the reacted mixture, carrying out washing, filtration, and desiccation; a method in which a polyolefin is irradiated with an ultraviolet ray or a radiation in the presence of a graft monomer; a method in which a polyolefin is irradiated with ionizing radiation, and thereafter the polyolefin is brought into contact with and mixed with a graft monomer; and a method in which exposure to oxygen or ozone is performed.

A modified polyolefin according to the present invention can be obtained by allowing graft-copolymerization of 0.01~50 parts by weight of a monomer mixture with 100 parts by weight of a polyolefin, wherein the monomer mixture contains 95~5% by weight of monomer $M_1$ and 95~5% of monomer $M_2$. In the case where the proportion of the monomer mixture is smaller than 0.01 parts by weight, treatment effects on the resin composition may not be observed. In the case where the proportion of the monomer mixture is larger than 50 parts by weight, the efficiency in the graft reaction deteriorates, and a copolymerized compound which is left unreacted or which has not formed a graft remains in the modified polyolefin; therefore, the properties such as heat resistance and chemical resistance are degraded.

In addition, the proportion of the organic peroxide in the production of the modified polyolefin according to the present invention may be 0.01~10 parts by weight with respect to 100 parts by weight of the polyolefin. In the case where the proportion of the organic peroxide is smaller than 0.01 parts by weight, treatment effects on the resin composition may not be observed. In the case where the proportion of the organic peroxide is larger than 100 parts by weight, properties inherent to the polyolefin are not exhibited, and the performances such as heat resistance and chemical resistance are degraded.

To component (a), various additives, which are conventionally used in a polyolefin, such as an anti-weathering agent including an antioxidant, an ultraviolet absorber, a light stabilizer, and the like, a nucleating agent, a lubricant, an anti-static agent, a colorant, a plasticizer, and a surface-gloss-improving agent may be added at such levels that such an additive does not interfere with the advantages of the present invention.

For component (b) of the present invention, a interstratified compound in which tetraalkylammonium cation is inserted in a swellable stratiform silicate is used.

An example of the swellable stratiform silicate in the present invention is a swellable clay compound having a charge density of 40 to 150 $Å^2$/charge, a basal plane distance d(001) of 7 to 15 Å, and a cation exchange capacity (CEC) of 25 to 200 milliequivalents/100 g.

An example of the swellable clay compound is a stratiform phyllosilicate mineral containing magnesium silicate or aluminum silicate. Examples of such stratiform phyllosilicate mineral are smectite clay minerals such as montmorillonite, saponite, beidellite, hectorite, nontronite, and stevensite; vermiculites such as trioctahedral vermiculite and dioctahedral vermiculaite; and micas such as muscovite, phlogopite, biotite, lepidolite, paragonite, and tetrasilicic. Another example is a compound synthesized into a swellable mica by conducting a fluorine treatment on a talc, or a compound having a structure similar to those of the above compounds, obtained by way of hydrothermal synthesis.

For the cation carried between strata, various compounds may be used which are obtained by replacement of various ions of the same kind such as sodium, potassium, and lithium.

The charge density in the strata of the swellable stratiform silicate is preferably 40~150 $Å^2$/charge, and more preferably 40 to 100 $Å^2$/charge. In the case where the charge density is lower than 40 $Å^2$/charge, such a swellable stratiform silicate as explained above cannot exist. In the case where the charge density is higher than 150 $Å^2$/charge, charges of the silicate strata greatly interact with each other, and therefore a desirable dispersibility in the synthetic resin is not obtained, and improvement in the mechanical strength and the heat resistance of the composite article is insufficient; thus, the charge density of larger than 150 $Å^2$/charge is not preferable.

The swellable stratiform silicate has a cation exchange capacity (CEC) of preferably 25~200 milliequivalents/100 g, and more preferably 50~150 milliequivalents/100 g. In the case where the CEC is smaller than 25 milliequivalents/100 g, the organic cation content in the lipophilic interstratified compound is small, and therefore a desirable dispersibility in the synthetic resin is not obtained, and improvement in the mechanical strength and the heat resistance of the composite article is insufficient. In the case where the CEC is larger than 200 milliequivalents/100 g, the content of organic cation, which is an organic substance of a low boiling point, is large, and therefore the heat resistance deteriorates; thus, the CEC of larger than 200 milliequivalents/100 g is not preferable.

The tetraalkylammonium cation in the present invention is an organic compound of a positive charge, which has a structure as shown in the following chemical formula:

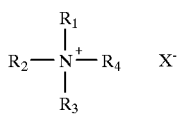

In the above chemical formula, each of $R_1$, $R_2$, $R_3$, and $R_4$ is an alkyl group having a carbon number of at least 1. It is preferable that at least one of these alkyl group have a carbon number length of the principal chain of 4~30 (i.e., C4~C30). In the case where the carbon number is smaller than 4, the gaps are not widened enough to weaken the binding force acting between the strata of the swellable stratiform silicate, and the lipophilicity of the swellable stratiform silicate cannot be enhanced; therefore, the filler is not uniformly dispersed in the resin, and the advantage of the present invention is not exhibited. In the case where the carbon number is larger than 30, the molecular size of the tetraalkylammonium cation is too large to be easily inserted in the gaps between the strata, and thus the absolute amount of the tetraalkylammonium cation is small; therefore, similarly to the above, the advantage of the present invention is not exhibited.

In addition, at least one of $R_1$, $R_2$, $R_3$, and $R_4$ may have a functional group at its distal end. Such a functional group may be, for example, a carboxyl group, hydroxyl group, and amino group.

Examples of the tetraalkylammonium compound having such a functional group at the distal end are N-alkylaminocarboxylic acids, N-alkylamino alcohols, and N-alkylamines.

Examples of the alkylaminocarboxylic acids are N-n-dodecyl-N,N-dimethyl-4-aminobutylcarboxylic acid, N-n-dodecyl-N,N-dimethyl-6-aminohexylcarboxylic acid, N-n-dodecyl-N,N-dimethyl-8-aminooctylcarboxylic acid, N-n-dodecyl-N,N-dimethyl-10-aminodecylcarboxylic acid, N-n-dodecyl-N,N-dimethyl-12-aminolaurylcarboxylic acid, N-n-dodecyl-N,N-dimethyl-14-aminotetradecylcarboxylic acid, N-n-dodecyl-N,N-dimethyl-16-aminohexadecylcarboxylic acid, N-n-dodecyl-N,N-dimethyl-18-aminooctadecylcarboxylic acid, and N-n-dodecyl-N,N-dimethyl-20-aminoeicosylcarboxylic acid.

Examples of the N-alkylamino alcohols are N-n-dodecyl-N,N-dimethyl-4-aminobutanol, N-n-dodecyl-N,N-dimethyl-6-aminohexanol, N-n-dodecyl-N,N-dimethyl-8-aminooctanol, N-n-dodecyl-N,N-dimethyl-10-aminodecanol, N-n-dodecyl-N,N-dimethyl-12-aminolauryl alcohol (N-n-dodecyl-N,N-dimethyl-12-aminododecanol), N-n-dodecyl-N,N-dimethyl-14-aminotetradecanol, N-n-dodecyl-N,N-dimethyl-16-aminohexadecanol, N-n-dodecyl-N,N-dimethyl-18-aminooctadecanol, and N-n-dodecyl-N,N-dimethyl-20-aminoeicosanol.

Examples of the N-alkylamines are 4-aminobutyl-N-n-dodecyl-N,N-dimethylammonium, 6-aminohexyl-N-n-dodecyl-N,N-dimethylammonium, 8-aminooctyl-N-n-dodecyl-N,N-dimethylammonium 10-aminodecyl-N-n-dodecyl-NN-dimethylammonium, 12-aminolauryl-N-n-dodecyl-N,N-dimethylammonium, 14-aminotetradecyl-N-n-dodecyl-N,N-dimethylammonium, 16-aminohexadecyl-N-n-dodecyl-N,N-dimethylammonium, 18-aminooctadecyl-N-n-dodecyl-N,N-dimethylammonium, and 20-aminoeicosyl-N-n-dodecyl-N,N-dimethylammonium.

In addition, in the above chemical formula, X is one of various halogen elements, in which chlorine is particularly preferable The lipophilic interstratified compound is obtained by inserting the above organic cation in the swellable stratiform silicate, whereby the swellable stratiform silicate undergoes a lipophilizing treatment in which an ion exchange reaction as well as swelling is carried out.

A lipophilizing treatment is carried out, for example, by fully solvating a swellable stratiform silicate with water, alcohol, or the like, thereafter adding such an organic cation as the above and stirring so as to replace metallic cation carried between the strata of the swellable stratiform silicate with the organic cation, and thereafter carrying out flushing of organic cation which has not replaced metallic cation, filtration, and desiccation. The amount of the organic cation to be added is determined by measuring the cation exchange capacity (CEC) of the swellable stratiform silicate by a method such as a column osmosis method (reference of which can be made to: "Nendo Handobukku" (Clay Handbook), pp. 576–577, Gihodo-shuppan) and a methylene blue adsorption measuring method (a standard test method of Japan Bentonite Industry Association, JPAS-107-91).

A column osmosis method described in the "Nendo Handobukku" is as follows:
1) Reagents: a) 1N acetic acid-ammonium solution:
    The same volumes of 2N aqueous ammonia and 2N acetic acid are mixed together, and then the pH value is adjusted to 7 by adding concentrated aqueous ammonia or acetic acid dropwise. b) 80% (by volume) ethyl alcohol: 99% or 96% ethyl alcohol is diluted to the desired concentration with distilled water, and then the pH value is adjusted to 7 by adding concentrated aqueous ammonia dropwise. c) 10% aqueous salt solution: 100 g of sodium chloride crystals is dissolved in 1000 ml distilled water.
2) Instrument and Measuring Procedure: a) Instrument for osmosis: An instrument for osmosis is constructed from a washing solution container, a leaching tube, and a receiving bottle, which are made of glass. These components are connected by rubber tubes and rubber plugs. The washing solution container has a capacity of 100 ml, and is graduated in 10 ml. The leaching tube is prepared by tapering a tube, which has a length of 12 cm and an inner diameter of 1.3, at the bottom portion, and then adding a leg tube having an inner diameter of 0.3 cm. b) Osmosis process: A small piece of cotton wool is stuffed in the bottom portion of the leaching tube. Pulped filter paper is poured over the cotton wool to form a filtration layer having a thickness of 5 mm. On the surface of the filtration layer, a clay powder specimen is filled. The amount of a clay to be tested is 0.2 to 2 g; however, the clay is mixed with quartz sand (0.1 mm or smaller) before the filling, the amount of the quartz sand being between the amount equal to that of the clay and double the amount. In addition, the filling must be carried out in a manner such that the entire specimen can be made wet during osmosis. Therefore, in practice, 1N acetic acid-ammonium solution is first put in the leaching tube, and then a mixture of weighed clay and quartz sand is dropped into the leaching tube by small amounts and is allowed to sink in the solution. Next, the washing solution container is connected to the leaching tube, and a cock provided at the lower portion of the washing solution container is opened so as to start washing with the acetic acid-ammonium solution. The dropping rate is controlled by adjusting the opening of the cock, so that the osmosis can be completed in 4 to 20 hours using 100 ml of the acetic acid-ammonium solution. When the osmosis with the acetic acid-ammonium solution is finished, an inner wall of the upper portion of the leaching tube is subsequently washed with 80% ethyl alclohol, and the clay column is washed with 50 ml of the same alcohol, so as to eliminate excessive acetic acid-ammonium solution. The thus-obtained column of clay saturated with ammonium ion is finally washed with 100 ml of 10% salt water, thereby exchanging and leaching ammonium ion. c) Measurement of ammonium ion and units of results: the entirety of the leached solution obtained in the receiving bottle is transferred to a 200 ml volumetric flask, to which a distilled water is added up to the indicator. With regard to a specific amount of the solution in the volumetric flask, the amount of ammonium ion is measured by a conventional method. From the thus-obtained value, a cation exchange capacity per unit weight of a clay specimen is calculated; however, a cation exchange capacity is normally expressed in milligram equivalent (meq) of cation per 100 g (or 1 g) weight of dry specimen.

The amount of the organic cation to be added is preferably in the range or 0.3~5 equivalents with respect to the CEC, and most preferably in the range of 0.3~2 equivalents. In the case where the amount of the organic cation to be added is smaller than 0.3 equivalents, the affinity to polyolefin and the dispersibility of the stratiform silicate in the polyolefin-based composite material deteriorate. In the case where the amount of the organic cation be added is greater than 5 equivalents, such properties as the heat resistance and the rigidity of the polyolefin-based composite material deteriorate.

The polyolefin-based composite material according to the present invention may be produced by thoroughly mixing, using a tumbler, a Henschel mixer, a ribbon mixer, or the like, (a) a modified polyolefin, or a polyolefin containing such a modified polyolefin in an amount of at least 1% by weight, the modified polyolefin being a graft copolymer of a monomer $M_1$ and a monomer $M_2$, and (b) a lipophilic interstratified compound; thereafter melt-kneading using a melt-kneading device; and dispersing by way of shearing. This production process can be conducted in the absence of a solvent.

In addition, a production process is preferable in which the composite material is produced by dispersing a lipophilic interstratified compound in a modified polyolefin, and thereafter further adding a polyolefin. In the latter step, it is preferable that the mixing in contact with the polyolefin be carried out in the presence of a coupling agent. By using a coupling agent, chemical bonds between polar groups in the modified polyolefin and distal functional groups in the organic cation are readily formed, whereby fixation to the polyolefin principal chain can efficiently take place.

Examples of such a coupling agent are hexamethylene diisocyanate, 2,4-tolylene diisocyanate, a mixture of 2,4-tolylene diisocyanate and 2,6-tolylene isocyanate, diphenylmethane diisocyanate, 1,5-naphthylene diisocyanate, xylylene diisocyanate, hydrogenated xylylene diisocyanate, and isophorone diisocyanate.

Examples of the melt-kneading device are a Banbury mixer, a continuous mixer with a rotor, and a twin-screw extruder (which has screws to revolve in the same or opposite directions).

The polyolefin-based resin composition according to the present invention is a polyolefin-based composite material in which proportions of the components are as follows:
(a) a copolymerized modified polyolefin or a polyolefin containing such a modified polyolefin in an amount of at least 1% by weight: 99.9~60% by weight;
(b) a lipophilic interstratified compound: 0.1~40% by weight.

In the case where the proportion of the lipophilic interstratified compound is smaller than 0.1% by weight, the heat resistance, the mechanical properties, or the like, of the composite material is not improved. In the case where the proportion of the lipophilic interstratified compound is larger than 40% by weight, the resin component is so small in quantity that the stratiform silicate cannot be fully dispersed, or that the stratiform silicate flocculates; therefore, the advantage of the present invention is not exhibited.

The stratiform silicate in the composite material according to the present invention is in the form of laminated bodies uniformly dispersed in the resin, each laminated body containing up to 10 silicate strata having a basal plane distance of 7 to 15 Å, and a length of at least 300 Å. Such a uniform dispersion of the stratiform silicate in the form of laminated bodies, each of which contains up to 10 silicate strata having a basal plane distance of 7 to 15 Å, and a length-of at least 300 Å, in the composite material according to the present invention, contributes to an extremely high aspect ratio and enhanced mechanical properties such as the rigidity and the impact resistance. In particular, the smaller the number of the laminated strata, the more the dispersibility is improved, and the more preferable.

The dispersion results from spallation due to physical and chemical actions between a functional group existing in the copolymerized modified polyolefin, such as carboxyl group, epoxy group, and hydroxyl group, and the lipophilic interstratified compound, as well as the shearing action from the mixing and melt-kneading, these actions overcoming attractive forces (van der Waals' forces, electrostatic attractive forces, and the like) acting between the strata of the silicate in the lipophilic interstratified compound.

That is to say, in the case of a polyolefin modified with a homopolymer portion of monomer $M_1$, the amount of functional group is too small, and thus the interaction on the stratiform silicate is too small to allow a uniform dispersion of the lipophilic interstratified compound without swelling and cleaving the stratiform silicate compound using a swelling/dispersing medium or the like, such as an organic solvent; in contrast, since component (a) of the present invention contains a copolymer portion of $M_1$ and $M_2$ in the modified polyolefin, the component (a) contains a large amount of functional group in comparison with a polyolefin modified with a homopolymer of $M_1$, and thus generates strong interactions with the stratiform silicate. Therefore, a polyolefin-based composite material having the advantages of the present invention can be produced without swelling and cleaving the stratiform silicate compound using a swelling/dispersing medium or the like, such as an organic solvent, but simply by carrying out mixing and melt-kneading without using a solvent; such a production process is much simpler and more economical than a conventional process.

Excellent advantages of the polyolefin-based composite material according to the present invention, not only those described above, also include advantages in a significant simplification in the dispersing step in comparison with conventional dispersing steps, such as a polymerization method, employed in order to disperse a filler, and therefore the polyolefin-based composite material according to the present invention can be produced economically and efficiently.

In brief,
(1) according to the process of the present invention, since a conventional kneader may be employed, and the process is simplified in comparison with a polymerization method;
(2) since spallation and dispersion of the lipophilic interstratified compound are caused by utilizing strong chemical interactions of ionic bonds or the like, procedures such as grinding and mixing of a stratiform mineral can be simplified, and reduction in aspect ratio due to excessive grinding does not occur; and (3) a polyolefin-based composite material obtained according to the present invention may be directly used in an injection molding, a heat-compression molding, or the like, and thus an economical and efficient production of molded article is possible.

In addition, to the polyolefin-based resin composition according to the present invention, any of an anti-weathering agent such as an antioxidant and an ultraviolet absorber, a lubricant, an anti-static agent, a colorant, and the like, which are conventionally used in a polyolefin, may be added at such levels that such an additive does not interfere with the advantages of the present invention.

(Examples)

The present invention will be explained in further detail by providing examples and comparative examples; however, the present invention is not limited to these examples.

First, three types of polyolefins (PP=1, PP-2, and PP-3) were prepared.

| | |
|---|---|
| PP-1: | MFR = 30 (g/10 minutes) product of Showa Denko K.K. |
| PP-2: | MFR = 6.0 (g/10 minutes) product of Showa Denko K.K. |
| PP-3: | MFR = 0.5 (g/10 minutes) product of Showa Denko K.K. |

(In the above, "MFR" stands for "melt flow rate".)

Using the above homopolyolefins, the following copolymerized modified polyolefins A~I, and homopolymerized modified polyolefins A~F were prepared.

double-screw kneader ("KTX-30", manufactured by Kobe Steel Co., Ltd.). As a result, the obtained copolymerized modified polyolefin A (GS-PP1) had additional GMA ($M_1$) with the amount of 1.6% by weight, additional styrene ($M_2$) with the amount of 1.2% by weight, and MFR=75 (g/10 minutes).

Copolymerized Modified Polyolefins B~F

In a manner similar to the preparation of copolymerized modified polyolefin A (GS-PP1), copolymerized modified polyolefins B~E (GS-PP2, GS-P3, MS-PP1, and MS-PP2) were prepared using GMA or maleic anhydride in the mixed amounts as shown in Table 2.

In addition, copolymerized modified polyolefin F (GS-PP4) was prepared in a manner similar to the above preparation of copolymerized modified polyolefin A, except for substituting PP-2 for PP-1.

Homopolymerized Modified Polyolefins A~F

Homopolymerized modified polyolefins A~F (G-PP1, G-PP2, G-PP3, M-PP1, M-PP2, and G-PP4) as comparative examples were prepared in a manner similar to the above preparations of copolymerized modified polyolefins A~F, except for omitting the use of monomer $M_2$ (styrene).

It is noted that the amounts of additional $M_1$ and $M_2$ in the copolymerized modified polyolefins in Table 2 were measured and determined using nuclear magnetic resonance (NMR) spectra and/or infrared (IR) absorption spectra.

TABLE 2

| | GMA (parts b weight) | Maleic anhydride (parts b weight) | Styrene (parts b weight) | Amount of additional M (% by weight) | Amount of additional $M_2$ (% by weight) | MFR (g/10 min) |
|---|---|---|---|---|---|---|
| Copolymerized modified polyolefin | | | | | | |
| A GS-PP1 | 5.0 | | 5.0 | 1.6 | 1.2 | 75 |
| B GS-PP2 | 2.0 | | 2.0 | 1.1 | 0.9 | 68 |
| C GS-PP3 | 10.0 | | 10.0 | 2.0 | 1.5 | 82 |
| D NS-PP1 | | 5.0 | 5.0 | 1.9 | 1.5 | 84 |
| E PS-PP2 | | 2.0 | 2.0 | 1.4 | 1.1 | 75 |
| F GS-PP4 | 5.0 | | 5.0 | 1.1 | 0.8 | 93 |
| Homopolymerized modified polyolefin | | | | | | |
| A G-PP1 | 5.0 | | — | o.9 | — | 92 |
| B G-PP2 | 2.0 | | — | 0.7 | — | 86 |
| C G-PP3 | 10.0 | | — | 1.1 | — | 104 |
| D M-PP1 | | 5.0 | — | 0.8 | — | 98 |
| E M-PP2 | | 2.0 | — | 0.7 | — | 90 |
| F G-PP4 | 5.0 | | — | 0.7 | — | 113 |

Copolymerized Modified Polyolefin A

Copolymerized modified polyolefin A was obtained by uniformly mixing 5.0 parts by weight of glycidyl methacrylate (GMA), 5.0 parts by weight of styrene, and 15.0 parts by weight of an organic peroxide (t-butyl peroxybenzoate, "PERBUTYL Z", manufactured by NOF Corp.) using a Henschel mixer, and heating and kneading at 200° C. with a retention time of about 3 minutes using a co-directional Copolymerized Modified Polyolefin G With respect to 100 parts of the above PP-3 which was irradiated with γ-rays at 50 kGy, 6.0 parts by weight of glycidyl methacrylate and 0.2 parts by weight of butyl vinyl ether were kneaded in contact therewith, and thereafter, a heat treatment was conducted in a nitrogen flow at 60° C. for 5 minutes so as to allow graft polymerization to occur, whereby a polypropylene was obtained. This polypropylene is called copolymerized modified polyolefin G (GM-PP3). The amount of additional GMA ($M_1$) in this polymer was 3.5% by weight, and the amount of the additional butyl vinyl ether ($M_2$) was 0.02% by weight.

It is noted that although polymer radicals existed when ESR measurement was carried out with respect to PP-3 which was irradiated with ionizing radiation, the polymer radicals disappeared after the heat treatment.

Copolymerized Modified Polyolefin H

With respect to 100 parts of the above PP-3 which was irradiated with γ-rays at 50 kGy, 10.0 parts by weight of glycidyl methacrylate and 0.01 parts by weight of benzyl vinyl ether were kneaded in contact therewith, and thereafter, a heat treatment was conducted in a nitrogen flow at 60° C. for 15 minutes so as to allow graft polymerization to occur, whereby a polypropylene was obtained. This polypropylene is called copolymerized modified polyolefin H (GM-PP4). The amount of additional GMA ($M_1$) in this polymer was 8.0% by weight, and the amount of the additional benzyl vinyl ether ($M_2$) was 0.005% by weight.

Copolymerized Modified Polyolefin I

With respect to 100 parts of the above PP-3 which was irradiated with γ-rays at 50 kGy, 10.0 parts by weight of glycidyl methacrylate and 0.1 parts by weight of N-vinylpyrrolidone were kneaded in contact therewith, and thereafter, a heat treatment was conducted in a nitrogen flow at 60° C. for 25 minutes so as to allow graft polymerization to occur, whereby a polypropylene was obtained. This polypropylene is called copolymerized modified polyolefin I (GM-PP5). The amount of additional GMA ($M_1$) in this polymer was 6.5% by weight, and the amount of the additional N-vinylpyrrolidone ($M_2$) was 0.02% by weight.

In addition, the following lipophilic interstratified compounds A~H were prepared.

Lipophilic Interstratified Compound A (TSM-1)

A fluorine-type synthetic mica ("ME-100", manufactured by Co-op Chemical Co., Ltd.; cation exchange capacity (CEC)=80 milliequivalents/100 g) is soaked with a distilled water in a beaker, and was stirred, whereby a suspension fluid was obtained. While the suspension fluid was stirred at 60° C., dioctadecyldimethylammonium chloride (a commercial reagent) was added in the proportion of 80 mmol with respect to 100 g of the fluorine-type synthetic mica. The mixture was stirred well, and a uniform suspension was prepared. The suspension was washed, centrifuged, and freeze-dried; then lipophilic interstratified compound A was obtained by grinding the freeze-dried substance.

Confirmation of the insertion of organic cation in the wellable stratiform silicate was carried out by measuring the increase in the distance of the gap between strata of the obtained lipophilic interstratified compound, according to the powder X-ray diffraction method using an X-ray diffraction device ("RINT 2000", manufactured by Rigaku Corporation). From the X-ray diffraction measuring, it was confirmed that the distance of the gap between strata in the lipophilic interstratified compound A increased from 1.0 nm (of the fluorine-type synthetic mica) to 3.6 nm.

In addition, the organic cation content in the gaps between strata was determined by thermogravimetry using a device for a differential thermal analysis/thermobalance measurement ("TG-DTA", manufactured by Rigaku Corporation). As a result, the organic cation content in the lipophilic interstratified compound A was 40% by weight.

Lipophilic Interstratified Compound B (TSM-2)

In a manner similar to the preparation of lipophilic interstratified compound A, lipophilic interstratified compound B was prepared from 100 g of fluorine-type synthetic mica and dioctadecyldimethylammonium chloride (48 mmol/100 g). The distance of the gap between strata was 3.5 nm, and the organic cation content was 30% by weight.

Lipophilic Interstratified Compound C (TSM-3)

In a manner similar to the preparation of lipophilic interstratified compound A, lipophilic interstratified compound C was prepared from fluorine-type synthetic mica and dioctadecyldimethylammonium chloride (32 mmol/100 g). The distance of the gap between strata was 3.2 nm, and the organic cation content was 17% by weight.

Lipophilic Interstratified Compound D (TSM-4)

In a manner similar to the preparation of lipophilic interstratified compound A, lipophilic interstratified compound D was prepared from fluorine-type synthetic mica and octyltrimethylammonium chloride (80 mmol/100 g, a commercial reagent). The distance of the gap between strata was 1.3 nm, and the organic cation content was 17% by weight.

Lipophilic Interstratified Compound E (TSM-5)

In a manner similar to the preparation of lipophilic interstratified compound A, lipophilic interstratified compound E was prepared from fluorine-type synthetic mica and hexadecyltrimethylammonium chloride (80 mmol/100 g, a commercial reagent). The distance of the gap between strata was 1.8 nm, and the organic cation content was 21% by weight.

Lipophilic Interstratified Compound F (SMC-1)

In a manner similar to the preparation of lipophilic interstratified compound A, lipophilic interstratified compound F was prepared from hydrophilic smectite ("SWN", manufactured by Co-op Chemical, Inc.; cation exchange capacity (CEC)=100 milliequivalents/100 g) and dioctadecyldimethylammonium chloride (100 mmol/100 g). The distance of the gap between strata was 2.1 nm, and the organic cation content was 42% by weight.

Lipophilic Interstratified Compound G (SMC-2)

In a manner similar to the preparation of lipophilic interstratified compound A, lipophilic interstratified compound G was prepared from hydrophilic smectite and dioctadecyldimethylammonium chloride (60 mmol/100 g). The distance of the gap between strata was 2.0 nm, and the organic cation content was 37% by weight.

Lipophilic Interstratified Compound H (TSM-6)

In a manner similar to the preparation of lipophilic interstratified compound A, lipophilic interstratified compound H (TSM-6), having the replaced ion amount of 80 milliequivalents/100 g, was prepared by allowing a fluorine-type synthetic mica ("ME-100", manufactured by Co-op Chemical Co., Ltd.; cation exchange capacity (CEC)=80 milliequivalents/100 g) and organic cation dioctadecyldimethylammonium chloride (100 mmol/100 g) and organic cation to react with N,N-dioctadodecyl-N-methylhexylammino alcohol chloride. The distance of the gap between strata was 1.8 nm, and the organic cation content was 24.2% by weight.

Examples 1~18

In accordance with the combinations as shown in Table 3, 85.5% by weight of one of the above polyolefins, 9.5% by weight of one of the above copolymerized modified polyolefins, and 5% by weight of one of the above lipophilic interstratified compounds (fillers) were melt-kneaded using a kneader, and polyolefin-based composite materials were obtained.

It is noted that in the production according to Example 14, the modified polyolefin and the filler were mixed in advance, and then the mixture was mixed with the polyolefin.

In addition, in Example 18, a resin composition having the inorganic filler content of 25% was prepared using lipophilic interstratified compound H (TSM-6), and when the resin composition was diluted, hexamethylene diisocyanate was added as a coupling agent in the proportion of 0.5 parts by weight with respect to 100 parts by weight of the total of the master batch and PP-1, and then these components were kneaded in contact with each other.

The kneading was conducted at a barrel temperature of 160~220° C., at a screw rotational frequency of 100 rpm, with a retention time of 3 minutes, using a co-directional double-screw kneader ("KTX-30", manufactured by Kobe Steel Co., Ltd.).

With respect to each of the obtained composite materials, the physical properties, that is, the modulus of flexural elasticity, the heat resistance, and the dispersibility, were measured. Test pieces for measuring the physical properties were formed by using an injection-molding machine ("MODEL 100", manufactured by FANUC, Ltd.), at the cylinder temperature of 200° C., under the injection pressure of 750 kg/cm$^2_1$, under the locking pressure of 100 tons.

The results of measurements are shown in Table 3.

Comparative Examples 1–14

Similarly to the above, in accordance with the combinations as shown in Table 4, 85.5% by weight of one of the polyolefins, 9.5% by weight of one of the homopolymerized modified polyolefins, and 5% by weight of one of the lipophilic interstratified compounds were melt-kneaded using a kneader, and polyolefin-based composite materials were obtained. The physical properties of the obtained composite materials are also shown in Table 4.

It is noted that in the production according to Comparative Example 14, the modified polyolefin and the filler were mixed in advance, and then the mixture was mixed with the polyolefin.

Measuring methods are explained in the following.

Modulus of Flexural Elasticity

A modulus of flexural elasticity was measured in accordance with ASTM D791 (under dry conditions, at 23° C.).

Heat Resistance (Thermal Deformation Temperature)

A thermal deformation temperature was measured in accordance with ASTM D648, where a load was given at the center portion of the test piece for 5 minutes, so that a fiber stress of 0.0464 mm$^2$ (66 psi) was applied, with the rate of temperature increase being 2±0.2° C./min.

Evaluation of Dispersed State of Stratiform Silicate

Evaluation of the dispersed state of stratiform silicate strata in a polyolefin resin matrix was made by directly observing particles in a composite material using a transmission electron microscope. A state of dispersion was evaluated according to the following criteria.

⊚ Composite material having: basal plane distance, 7~15 Å; length, 300 Å or longer; proportion of laminates having 10 strata or less, 80% or more, uniformly dispersed in the resin.

○ Composite material having: basal plane distance, 7~15 Å; length, 300 Å or longer; proportion of laminates having 10 strata or less, 50% or more, uniformly dispersed in the resin.

Δ Composite material having: basal plane distance, 7~15 Å; length, 300 Å or longer; proportion of laminates having 10 strata or less, 20% or more, uniformly dispersed in the resin.

× Composite material having: basal plane distance, 7~15 Å; length, 300 Å or longer; proportion of laminates having 10 strata or less, less than 20%, dispersed in the resin.

TABLE 3

| Example | Components (% by weight) Polyolefin 85.5 wt % | Modified polyolefin 9.5 wt % | Filler 5 wt % | Flexural elasticity modulus kgf/cm$^2$ | Heat resistance (HDT) 66 psi, °C. | Dispersibility (TEM image) |
|---|---|---|---|---|---|---|
| 1 | PP1 | GS-PP1 | TSM-1 | 27,400 | 144 | ⊚ |
| 2 | PP1 | GS-PP2 | TSM-1 | 26,600 | 143 | ○ |
| 3 | PP1 | GS-PP3 | TSM-1 | 27,900 | 146 | ⊚ |
| 4 | PP1 | MS-PP1 | TSM-1 | 26,600 | 138 | ○ |
| 5 | PP1 | MS-PP2 | TSM-1 | 25,200 | 140 | Δ |
| 6 | PP1 | GS-PP1 | TSM-2 | 28,300 | 141 | ○ |
| 7 | PP1 | GS-PP1 | TSM-3 | 27,900 | 143 | ○ |
| 8 | PP1 | GS-PP1 | TSM-4 | 28,400 | 145 | ⊚ |
| 9 | PP1 | GS-PP1 | TSM-5 | 28,800 | 146 | ○ |
| 10 | PP1 | GS-PPi | SMC-1 | 25,800 | 136 | ⊚ |
| 11 | PP1 | MS-PP1 | SMC-1 | 25,200 | 135 | ⊚ |
| 12 | PP1 | GS-PP1 | SMC-2 | 25,000 | 138 | ○ |
| 13 | PP2 | GS-PP4 | TSM-1 | 24,700 | 138 | ○ |
| 14 | PP1 | (GS-PP1) + (TSM-1) | | 28,600 | 147 | ⊚ |
| 15 | PP1 | GM-PP3 | TSM-1 | 29,700 | 146 | ⊚ |
| 16 | PP1 | GM-PP4 | TSM-1 | 30,000 | 144 | ⊚ |
| 17 | PP1 | GM-PP5 | TSM-1 | 29,300 | 140 | ⊚ |
| 18 | PP1 | (GM-PP3) + (TSM-1) | | 30,000 | 149 | ⊚ |

TABLE 4

| Comparative Example | Components (% by weight) | | | Flexural elasticity modulus kgf/cm$^2$ | Heat resistance (HDT) 66 psi, °C. | Dispersibility (TEM image) |
|---|---|---|---|---|---|---|
| | Polyolefin 85.5 wt % | Modified polyolefin 9.5 wt % | Filler 5 wt % | | | |
| 1 | PP1 | G-PP1 | TSM-L | 23,500 | 138 | ○ |
| 2 | PP1 | G-PP2 | TSM-1 | 22,100 | 135 | Δ |
| 3 | PP1 | G-PP3 | TSM-1 | 24,100 | 140 | ○ |
| 4 | PP1 | M-PP1 | TSM-1 | 22,400 | 137 | Δ |
| 5 | PP1 | M-PP2 | TSM-1 | 21,800 | 134 | x |
| 6 | PP1 | G-PP1 | TSM-2 | 23,900 | 140 | Δ |
| 7 | PP1 | G-PPI | TSM-3 | 22,800 | 140 | x |
| 8 | PP1 | G-PP1 | TSM-4 | 24,400 | 142 | ○ |
| 9 | PP1 | G-PP1 | TSM-5 | 24,500 | 142 | ○ |
| 10 | PP1 | G-PP1 | SMC-1 | 22,200 | 135 | ○ |
| 11 | PP1 | M-PP1 | SMC-1 | 21,900 | 133 | Δ |
| 12 | PP1 | G-PP1 | SMC-2 | 22,000 | 135 | Δ |
| 13 | PP2 | G-PP4 | TSM-1 | 22,300 | 135 | x |
| 14 | PP1 | (G-PP1) + (TSM-1) | | 24,600 | 142 | ○ |

The results shown in tables 3 and 4 demonstrate that a composite material according to examples of the present invention in which a copolymerized modified polyolefin was combined had an excellent dispersion state of stratiform silicate, an enhanced modulus of flexural elasticity, and an enhanced heat resistance, in comparison with a composite material according to comparative examples in which a homopolymerized modified polyolefin was combined.

Moreover, the composite material produced according to Example 14, in which modified polyolefin and lipophilic interstratified compound were melt-kneaded in advance, and then polyolefin was added thereto, particularly had an excellent dispersion state and other physical properties in comparison with materials prepared by conducting kneading at one time.

What is claimed is:

1. A polyolefin-based composite material characterized by comprising:
   (a) 99.9 to 60% by weight of a modified polyolefin or a polyolefin containing such a modified polyolefin in an amount of at least 1% by weight, the modified polyolefin having a copolymer portion as a graft or a block in a polyolefin, the copolymer portion made of an unsaturated carboxylic acid or a derivative thereof and a monomer, which has a monomer reactivity ratio, the product of which, when multiplied by a monomer reactivity ratio of the unsaturated carboxylic acid or the derivative thereof, is 1 or less; and
   (b) 0.1 to 40% by weight of a lipophilic interstratified compound in which tetraalkylammonium cation is inserted in a swellable stratiform silicate.

2. A polyolefin-based composite material according to claim 1, wherein the monomer reactivity ratio of the unsaturated carboxylic acid or the derivative thereof is 1 or less, and the monomer reactivity ratio of the monomer to be copolymerized with the unsaturated carboxylic acid or the derivative thereof is 1 or less.

3. A polyolefin-based composite material according to claim 1, wherein the swellable stratiform silicate has a charge density of 40 to 150 Å$^2$/charge, a basal plane distance d(001) of 7 to 15 Å, and a cation exchange capacity of 25 to 200 milliequivalents/100 g.

4. A polyolefin-based composite material according to claim 1, wherein the tetraalkylammonium cation has at least one alkyl group having a carbon number length of the principal chain of 4 to 30, and in an amount of 0.3 to 5 equivalents with respect the cation exchange capacity of the swellable stratiform silicate.

5. A polyolefin-based composite material according to claim 1, wherein the swellable stratiform silicate is uniformly dispersed as stratified bodies having a length of at least 300 Å and having up to 10 strata.

6. A process for producing a polyolefin-based composite material of claim 1, the process comprising the step of melt-kneading in the absence of a solvent (a) 99.9 to 60% by weight of a modified polyolefin, or a polyolefin containing such a modified polyolefin in an amount of at least 1% by weight, the modified polyolefin having a copolymer portion as a graft or a block in a polyolefin, the copolymer portion being made of an unsaturated carboxylic acid or a derivative thereof and a monomer, which has a monomer reactivity ratio, the product of which, when multiplied by a monomer reactivity ratio of the unsaturated carboxylic acid or the derivative thereof, is 1 or less, together with (b) 0.1 to 40% by weight of a lipophilic interstratified compound in which a tetraalkylammonium cation is inserted in a swellable stratiform silicate.

7. A process for producing a polyolefin-based composite material according to claim 6, wherein the lipophilic interstratified compound is dispersed in the absence of a solvent into the modified polyolefin; and thereafter, melt-kneading being carried out together with a polyolefin.

8. A process for producing a polyolefin-based composite material according to claim 7, wherein the modified polyolefin is obtained by irradiating a polyolefin with ionizing radiation, and thereafter bringing the polyolefin into contact with an unsaturated carboxylic acid or a derivative thereof, and with a monomer, which has a monomer reactivity ratio, the product of which, when multiplied by a monomer reactivity ratio of the unsaturated carboxylic acid or the derivative thereof, is 1 or less.

9. A process for producing a polyolefin-based composite material according to claim 6, wherein the modified polyolefin is obtained by irradiating a polyolefin with ionizing radiation, and thereafter bringing the polyolefin into contact with an unsaturated carboxylic acid or a derivative thereof, and with a monomer, which has a monomer reactivity ratio, the product of which, when multiplied by a monomer reactivity ratio of the unsaturated carboxylic acid or the derivative thereof, is 1 or less.

10. A process for producing a polyolefin-based composite material of claim 1, the process comprising the steps of:

kneading a modified polyolefin and a lipophilic interstratified compound in contact in the absence of a solvent; the modified polyolefin being obtained by irradiating a polyolefin with ionizing radiation and thereafter bringing the polyolefin into contact with an unsaturated carboxylic acid or a derivative thereof, and with a monomer, which has a monomer reactivity ratio, the product of which, when multiplied by a monomer reactivity ratio of the unsaturated carboxylic acid or the derivative thereof, is 1 or less, the thus-obtained modified polyolefin having a copolymer portion as a graft or a block in a polyolefin, the copolymer portion being made of the unsaturated carboxylic acid or the derivative thereof and the monomer; and the lipophilic interstratified compound being obtained by inserting a tetraalkylammonium cation into a swellable stratiform silicate; and bringing the kneaded mixture into contact with and mixing with a polyolefin in the presence of a coupling agent, so as to form a polyolefin containing the modified polyolefin in an amount of at least 1% by weight;

wherein the amount of the polyolefin containing the modified polyolefin is 99.9 to 60% by weight, and the amount of lipophilic interstratified compound is 0.1 to 40% by weight.

* * * * *